United States Patent [19]

Meyer et al.

[11] Patent Number: 5,644,777

[45] Date of Patent: Jul. 1, 1997

[54] FIELD RECONFIGURATION DATA BUS CABINET COMPUTER SYSTEM

[75] Inventors: Mark R. Meyer, Marion; Lee A. Johnson, Cedar Rapids, both of Iowa

[73] Assignee: Rockwell International Corporation, Seal Beach, Calif.

[21] Appl. No.: 846,209

[22] Filed: Mar. 4, 1992

[51] Int. Cl.$^6$ .................................................. G06F 13/20
[52] U.S. Cl. ................. 395/800; 395/200.02; 395/200.1; 395/281; 395/306; 364/DIG. 1
[58] Field of Search ........................... 395/800, 200, 395/325, 250, 200.02, 200.1, 281, 306; 364/DIG. 1, DIG. 2

[56] References Cited

U.S. PATENT DOCUMENTS

| | | | |
|---|---|---|---|
| 4,587,651 | 5/1986 | Nelson et al. | 370/88 |
| 5,036,479 | 7/1991 | Prednis et al. | 324/158 R |
| 5,184,312 | 2/1993 | Ellis | 364/551.01 |
| 5,223,788 | 6/1993 | Andreano et al. | 364/571.02 |

*Primary Examiner*—Alyssa H. Bowler
*Assistant Examiner*—Dzung C. Nguyen
*Attorney, Agent, or Firm*—Gregory G. Williams; M. Lee Murrah; George A. Montanye

[57] ABSTRACT

An enhanced modular avionics system for communication and processing in an air transport aircraft including a modular avionic cabinet having a first scsi bus for a first processor and associate memory wherein the first scsi bus extends across a first portion of the cabinet and a second scsi bus for connection to a second processor and associate memory which extends across a second portion of the cabinet where the first portion of the cabinet and the second portion of the cabinet together equal the entire cabinet and there is no overlapping between the first portion and the second portion. Also shown is an extended bus which extends the entire length of the cabinet. The extended bus is located a predetermined distance from the top edge of the cabinet, while the first and second buses are located in a parallel line with each other and with the extended bus, the same predetermined distance from the bottom edge of the cabinet.

3 Claims, 3 Drawing Sheets

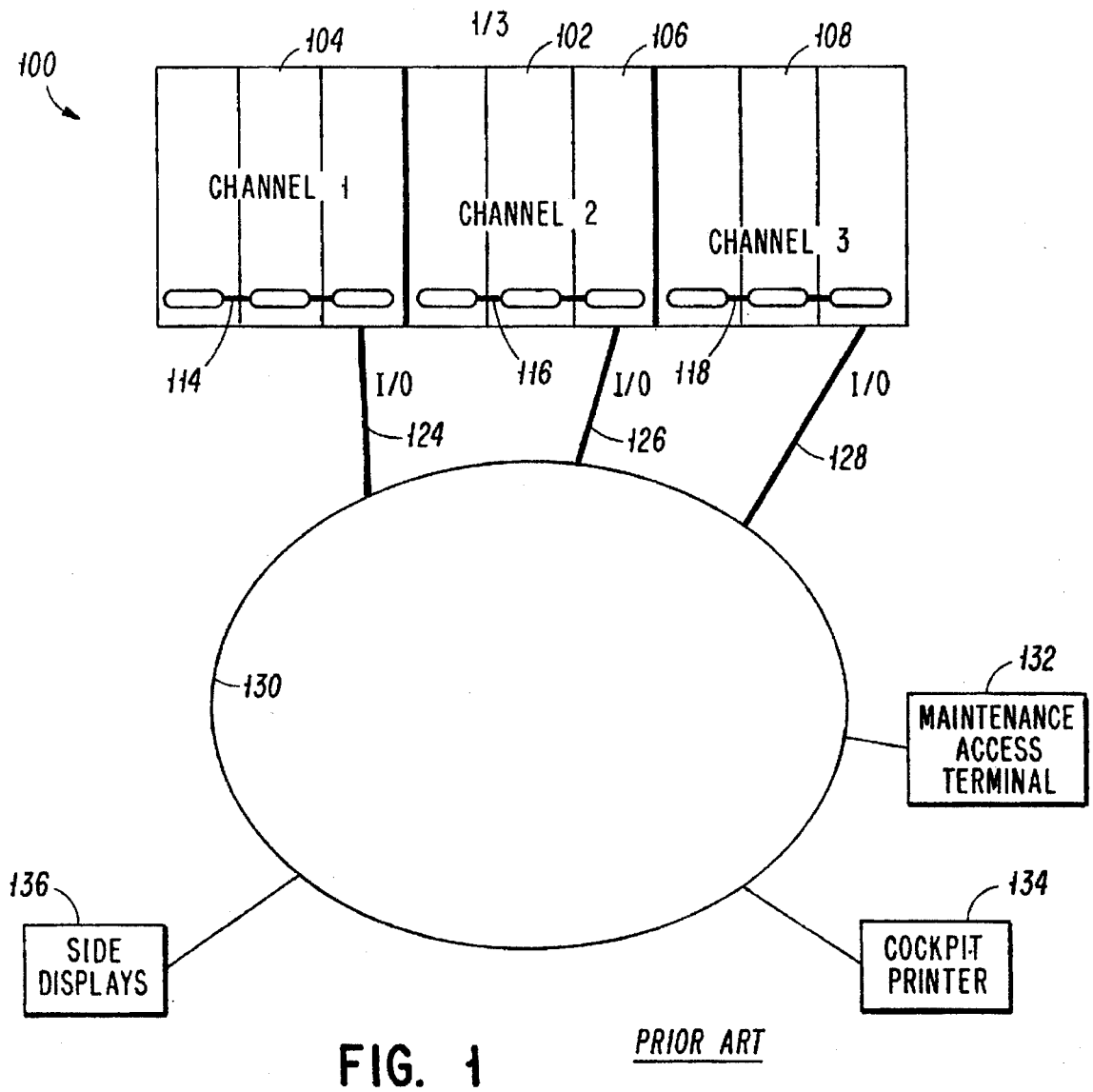
FIG. 1 *PRIOR ART*
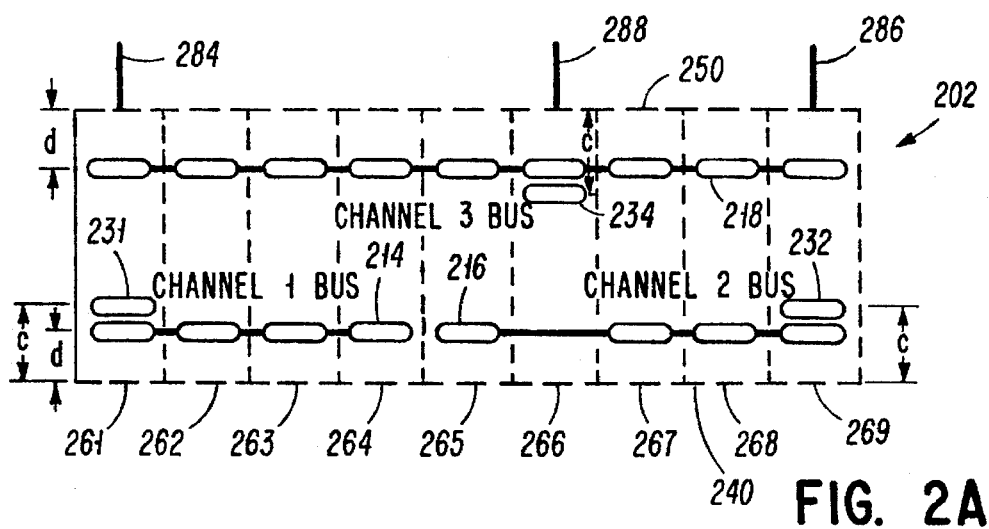
FIG. 2A

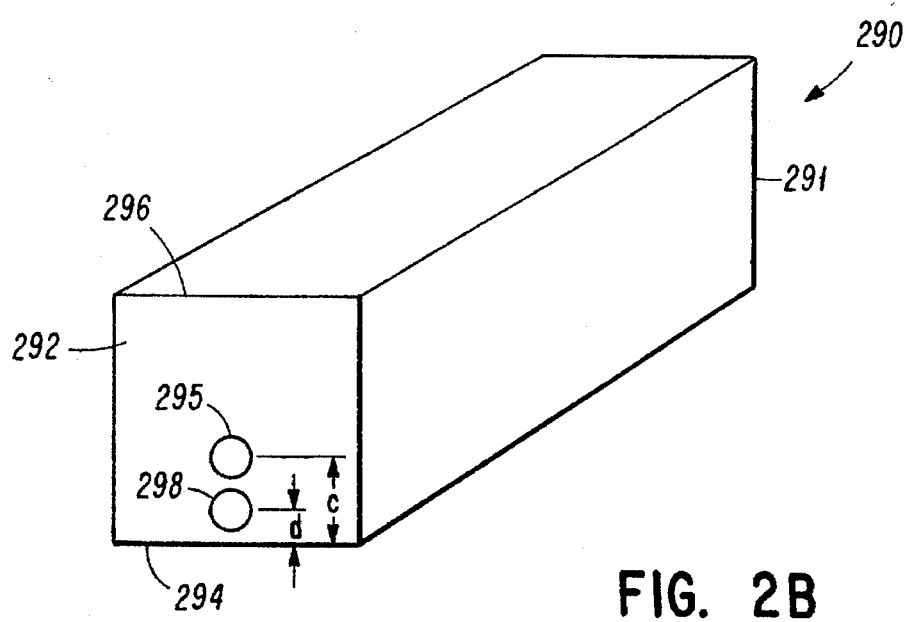
FIG. 2B
FIG. 4
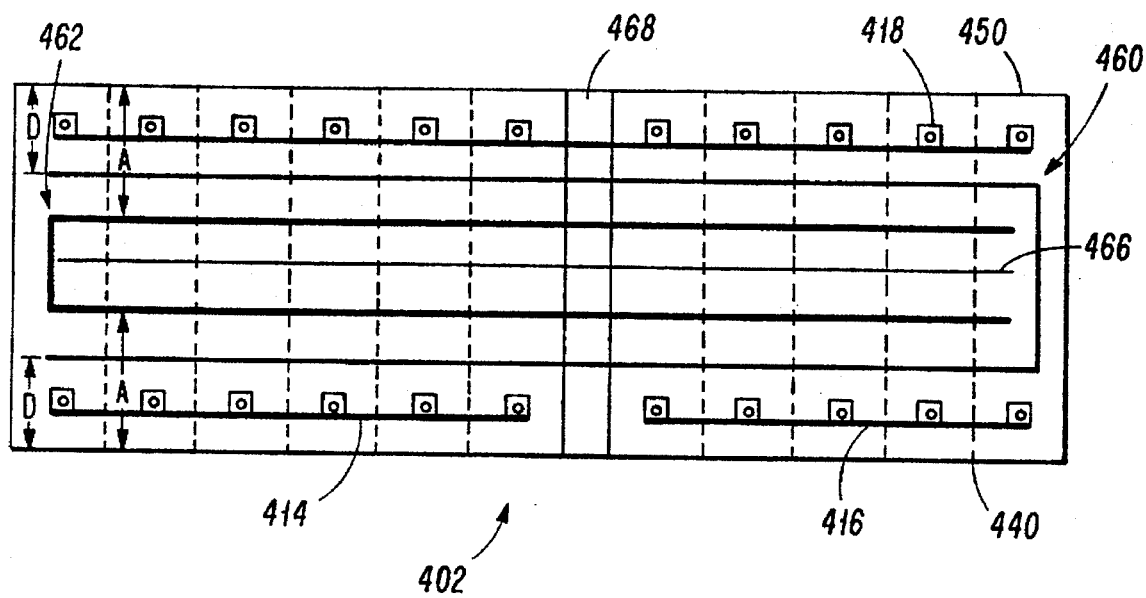

FIELD RECONFIGURATION DATA BUS CABINET COMPUTER SYSTEM

CROSS-REFERENCED APPLICATIONS

This application relates to the subject matter of a co-pending application by Robert L. Murr, entitled "Electronic Library System Having Ring-Bus Architecture With High Reliability Backplane", filed on Mar. 4, 1992 herewith and assigned to the same assignee, the Ser. No. of which is 07/846,182 now U.S. Pat. No. 5,408,616; the subject matter of this application is incorporated herein by this reference.

BACKGROUND OF THE INVENTION

The present invention generally relates to aviation electronics, and more particularly concerns electronic systems for providing computing abilities to air crews, and even more particularly relates to an avionics computer system which has therein several independent subcomputer systems.

For years, pilots and members of the crew of airliners have been called upon to do numerous and various tasks that might be characterized as important, complicated and routine. Such tasks include calculating the fuel necessary to travel to an unscheduled landing spot, calculating the aircraft weight for determining compliance with airstrip restrictions, etc. Additionally, they are frequently looking through books to find and study the landing and taxiway configurations of many unfamiliar airfields. Recently, it has been proposed that the pilots and crew be provided with an Electronic Library System or ELS, which is a specially designed computer for the airliner crew. It has been proposed that this ELS contain the capability of providing a lower cost initial computer subsystem with the built in ability to add two more independent and identical computer subsystems.

It has been proposed that this be accomplished by providing a single ELS cabinet with three sectors therein with each sector being dedicated to accommodating a single computer subsystem. Each sector would include an equal number of slots for receiving line replaceable modules or LRMs. The LRMS would be processor modules and memory modules.

While this proposed electronic library system has received considerable acceptance in the industry, it does have several serious drawbacks.

First of all, the electronic library system with the three subsystems therein and where the total system is divided into three sectors with the same, or an arbitrarily predetermined, number of slots dedicated to each sector, has a fixed configuration. The problem with such an approach is that some users may desire to use the ELS for different purposes, which may not lend themselves to the fixed three subsystem approach. For example, one airline may wish to use the electronic library system to store electronically all runway maps of major airports in the U.S. This may require more memory than would be available to any one of the three independent dedicated subsystem as suggested.

Consequently, there exists a need for improvement in the electronic library systems where the independent computer subsystems are flexible within the fixed cabinet thereby allowing for increased user flexibility.

SUMMARY OF THE INVENTION

It is an object of the present invention to greatly increase the flexibility of an avionics electronic library system.

It is a feature of the present invention to provide an electronic library system which includes three separate independent computer subsystems, where the relative size of each computer subsystem is flexible within the fixed electronic library system cabinet.

It is an advantage of the present invention to provide airlines with the flexibility of tailoring an electronic library system for there own peculiar needs.

It is another object of the present invention to provide an improved line replaceable module mounting system.

It is another feature of the present invention to include three independent scsi buses within the electronic library system cabinet where one scsi bus runs the entire length of the cabinet connecting all slots and the remaining two scsi buses connect with two subsets of slot were each subset is mutually exclusive and where the sum of the subsets is totally inclusive of all slots of the cabinet.

It is another advantage of the present invention to allow for easy and quick reconfiguration of the subcomputer systems within the electronic library system.

The present invention provides an electronic library system for use in the avionics market which is designed to fulfill the aforementioned needs, satisfy the earlier propounded objects, contain the above described features, and produce the previously stated advantages. The invention is carried out by a "nondesignated slot system", in the sense that the designated slots within the electronic library system cabinet for each computer subsystem has been eliminated. Instead, the electronic library system of the present invention provides for flexibility of the slots to be used in one or more of the computer subsystems.

Accordingly, the present invention relates to an improved electronic library system which includes a first bus extending across all of the slots of the system cabinet, a second independent and third independent bus which when taken together, extend across all the slots of the electronic library system cabinet.

BRIEF DESCRIPTION OF THE DRAWINGS

The invention may be more fully understood by reading the following description of the preferred embodiments of the invention in conjunction with the appended drawings wherein:

FIG. 1 is a functional block diagram representation of a proposed electronic library system of the prior art, which shows the electronic library system cabinet being divided into three equal and dedicated subcomputer systems.

FIG. 2A is a simplified schematic diagram of the bus architecture of the present invention, showing the first and second buses together extending the entire length of the cabinet and the third bus extending the entire length of the cabinet.

FIG. 2B is a perspective view of a processor LRM of the present invention.

FIG. 4 is a simplified schematic diagram of the system of the present invention which also shows three additional LAN configurations within the cabinet.

DETAILED DESCRIPTION

Figure 3:
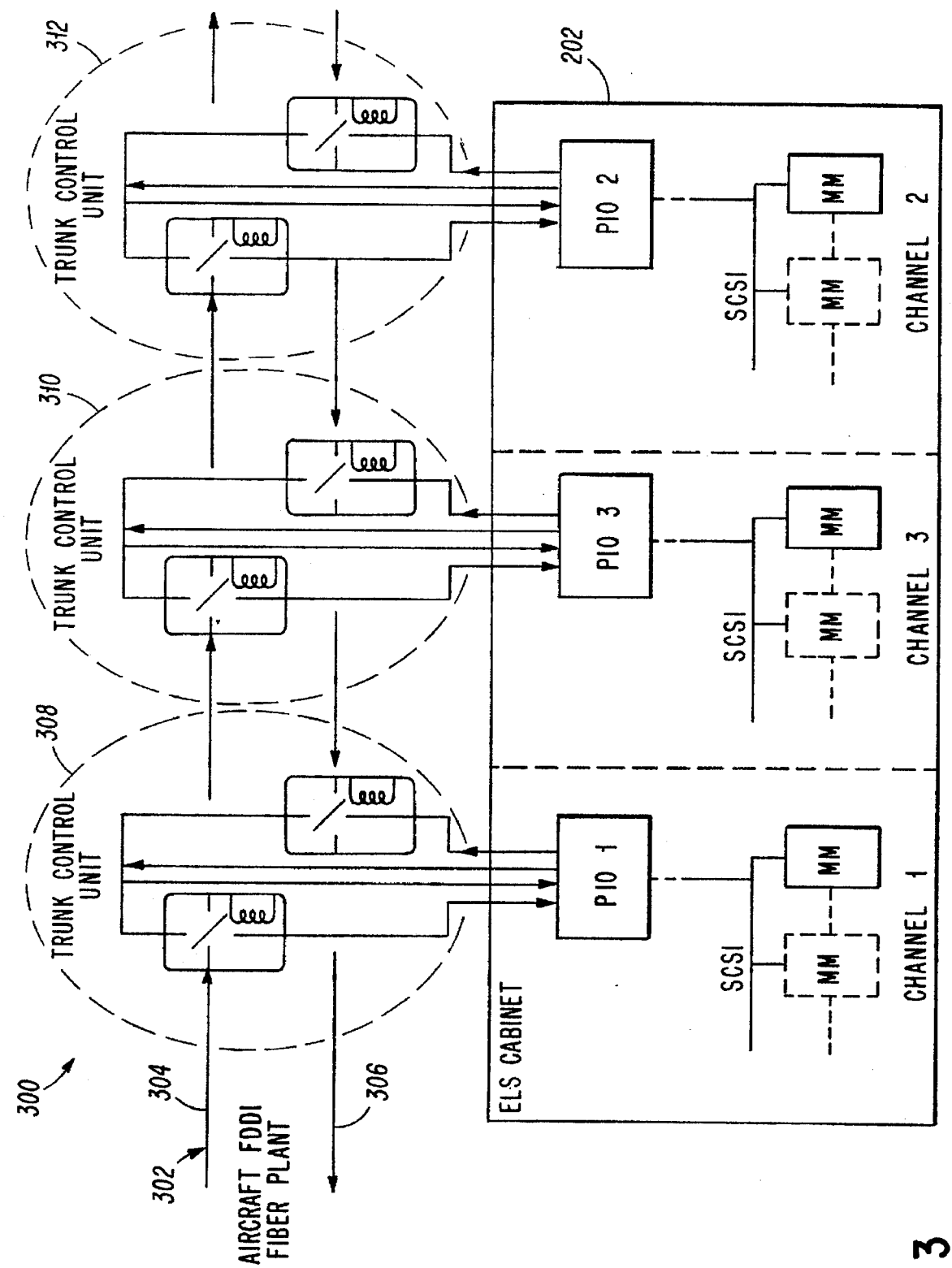
FIG. 3 is a functional block diagram figure of the entire electronic library system of the present invention including the fiber optic data communication network of the aircraft.

Now referring to the drawings, where like numerals therein refer to like structure throughout. Now referring to FIG. 1, there is shown a prior art modular avionics system designated 100 having a modular avionics cabinet 102 disposed therein, which contains three separate independent and identical channels 104, 106, and 108. Each channel is shown having three individual slots therein. The cabinet 102 is shown having buses 114, 116 and 118 disposed therein. Also shown are I/O ports 124, 126 and 128, which each connect to data distribution network 130 having a maintenance access terminal 132, a cockpit printer 134, and a side display 136 coupled thereto.

The buses 114, 116 and 118 are independent from each other and are each wholly contained in channels 104, 106 and 108 respectively.

Now referring to FIG. 2A, there is shown an ELS cabinet of the present invention, generally designated 202 having a first bus 214, a second bus 216, and a third bus 218 disposed therein. Each bus is preferably a scsi bus but other buses may be substituted as a matter of designers choice. Buses 214 and 216 are shown disposed a distance d from the bottom 240 of the cabinet 202 and along a parallel line. Third bus 218 is shown a distance d from the top 250 of cabinet 202. Cabinet 202 is shown divided into nine separate slots 261, 262, 263, 264, 265, 266, 267, 268 and 269. Note the number of slots is a function of LRM widths. In a different application there could be more or less slots depending upon the peculiar design requirements. The first bus 214 extends across and connects slots 261–264 while second bus 216 extends across 265, 267, 268 and 269. Third bus 218 extends across all slots 261–269. Slots 261–269 are designed for receiving mass memory or processor LRMs. Power supply slots may be located at each end (not shown).

Now referring to FIG. 2B, there is shown a line replaceable module LRM, of the present invention, generally designated 290 having a front side 291, a back side 292, having a bottom edge 294, and a top edge 296. Disposed on back side 292 of LRM 290 between top edge 296 and bottom edge 294, a distance d from bottom edge 294 is bus connector 298.

Now referring to FIGS. 2A and 2B, it can be seen that the LRM 290 can be inserted into any slot 261–269 so that top edge 296 of LRM 290 is adjacent to top side 250 of cabinet 202. In such a configuration, bus connector 298 would connect with either bus 214 or bus 216, depending upon which slot LRM 290 was inserted. However, if LRM 290 was inserted into a slot so that bottom edge 294 of LRM 290 was adjacent with the top edge 250 of cabinet 202, (ie. upside down) then bus connector 298 would connect with bus 218. Consequently, a single LRM 290 may be caused to be connected to different buses merely by the flipping of the LRM to an upside down orientation. This provides for much enhanced flexibility of the entire system.

Cabinet 202 is shown having I/O ports 284, 286 and 288. These ports are included for providing the capability of input and output from the ELS cabinet 202 to a data distribution network (not shown). Port 284 is shown disposed in slot 261 and is preferably used for coupling a processor, which might be coupled to bus 214, to the data distribution network. Similarly, port 286 is shown disposed in slot 269 for allowing a processor LRM disposed therein to achieve input and output with the data distribution network and port 288 is shown disposed in slot 266 for receiving an LRM processor for connection with bus 218. Now referring to FIG. 2B, there is shown on LRM 290 along its backside 292 an I/O LRM connector 295 disposed a distance c from the bottom edge 294. Now referring to FIG. 2A, slots 261 and 269 are shown having I/O cabinet connectors 231 and 232 disposed therein a distance c from the bottom edge 240 of cabinet 202. Also shown in slot 266 is an I/O cabinet connector 234 disposed a distance c from the top edge 250 of cabinet 202.

If LRM 290 is inserted into slot 261 in an upright position so that edge 296 adjacent to top side 250, then the I/O LRM connector 295 will connect with the I/O cabinet connector 231, thereby providing input/output capability with the LRM and the data distribution network. Similarly, if LRM 290 is inserted into slot 269 in the upright fashion, the connector 295 will couple with connector 232. However, in order for the LRM 290 to be coupled with both the bus 218 and the data distribution network, the LRM 290 must be inserted in an upside down fashion into slot 266 so that the LRM connector 295 couples with cabinet connector 234 and bus connector 298 couples with bus 218.

The above described configuration of the cabinet, buses and LRMs provides an enhanced ability for flexibility of the ELS system in that a single system may populate the entire cabinet 202 by coupling with bus 218 or two systems may be utilized by coupling LRMs with two of the buses 214, 216 or 218 and also it is possible for three channels to exist by coupling LRMs to all three buses 214, 216 and 218.

Now referring to FIG. 3, there is shown the ELS system of the present invention generally designated 300, which shows a functional organization of the cabinet 202 into separate channels. Also shown is the data distribution network 302, which includes counterrotating fiber optic cables 304 and 306. Each channel is shown having a processor disposed therein with two inputs into each processor and two outputs which all couple with the fiber optic data distribution network 302 by one of optical coupling systems 308, 310 and 312. Each channel is shown having two LRMs disposed therein for mass memory, however, this is a matter of designers choice and is shown merely for example. Many other configurations of processors and memory modules could be utilized.

LRM processors 341, 342 and 343 connect with each other by way of the fiber optic network 302. At alternate LAN for communicating between processors within the cabinet 202 is disclosed in FIG. 4.

Now referring to FIG. 4, there is shown an ELS cabinet, of the present invention, generally designated 402 having a first scsi bus 414, a second scsi bus 416 and a third scsi bus 418. Also shown is a primary LAN 460, alternate LAN 462, and nonessential LAN 466 and interface module 468, which is coupled with LANs 462, 464 and 466 and with an external data distribution network (not shown).

The primary LAN is positioned a distance D from the top edge 450 and the bottom edge 440 of cabinet 402. Alternate LAN is positioned a distance of A from top edge 450 and bottom edge 440. Nonessential LAN 466 is shown disposed down the center of the cabinet 402. Consequently, the inversion of an LRM to select which scsi bus it will connect with will not alter that LRM's ability to connect with either the primary LAN 460, alternate LAN 462 or the nonessential LAN 466. Flexibility of processors connecting to scsi buses is maintained while maintaining ability to communicate with other processors within the cabinet 402.

While the above description refers frequently to an ELS it must be understood that the present invention may be any modular avionics system configured to perform other functions such as navigation or flight instruments. The reference to ELS is illustrative of only one potential use for such modular avionics systems.

While particular embodiments of the present invention have been shown and described, it should be clear that changes and modifications may be made to such embodiments without departing from the true scope and spirit of the invention. It is intended that the appended claims cover all such changes and modifications.

We claim:

1. An improved avionics electronic library system for use in an aircraft computer and communication system of the type having an aircraft data distribution network therein, the electronic library system comprising:

an electronic library system cabinet having a top side and a bottom side and having plurality of slots therein and said cabinet coupled with said aircraft data distribution network;

said cabinet having a first bus extending across and connecting each of said plurality of slots;

said cabinet having a second bus extending across a first subset of said plurality of slots;

said cabinet having a third bus extending across a second subset of said plurality of slot;

said first subset and said second subset having none of said plurality of slots in common and none of said plurality of slots are absent from the combination of both said first subset and said second subset; and, said first bus located a predetermined distance from said top side, said second and third buses are located said predetermined distance from said bottom side.

2. A modular avionics system for use in an aircraft computer and communication system of the type having an aircraft data distribution network therein: the modular avionics system comprising:

modular avionics system cabinet, having a top side and a bottom side and having a first slot, second slot, third slot and fourth slot therein said cabinet coupled with said aircraft data distribution network;

said cabinet having a first bus extending across and connecting said first slot, said second slot, said third slot and said fourth slot;

said cabinet having a second bus extending across said first slot and said second slot, but not across said third slot and said fourth slot;

said cabinet having a third bus extending across said third slot and said fourth slot, but not across said first slot and said second slot;

said first bus is positioned parallel to said top side of said cabinet and at a predetermined top distance from said top side;

said second bus is disposed parallel to said bottom side of said cabinet and at a predetermined bottom distance from said bottom side;

said third bus is parallel with said bottom side of said cabinet and is located at said predetermined bottom distance from said bottom side; and, said predetermined top distance, and said predetermined bottom distance are equal.

3. An improved modular avionics system for use in an aircraft computer and communication system of the type having an aircraft data distribution network therein, the improved modular avionics system comprising:

a system cabinet having a top side and a bottom side and a plurality of slots therein, said cabinet coupled with said aircraft data distribution networks;

said cabinet having a first bus extending across and connecting each of said plurality of slots;

said cabinet having a second bus extending across a first subset of said plurality of slots;

said cabinet having a third bus extending across a second subset of said plurality of slots;

said first set and said second subset having none of said plurality of slots in common and none of said plurality of slots are absent from the combination of both first subset and second subset; and, said first bus located a predetermined distance from said top side and said second and third buses located said predetermined distance from said bottom side.

* * * * *